(12) United States Patent  
Takahashi

(10) Patent No.: US 12,537,415 B2
(45) Date of Patent: Jan. 27, 2026

(54) ROTARY ELECTRIC MACHINE

(71) Applicant: SUBARU CORPORATION, Tokyo (JP)

(72) Inventor: Ryota Takahashi, Tokyo (JP)

(73) Assignee: Subaru Corporation, Tokyo (JP)

( * ) Notice: Subject to any disclaimer, the term of this patent is extended or adjusted under 35 U.S.C. 154(b) by 348 days.

(21) Appl. No.: 18/241,032

(22) Filed: Aug. 31, 2023

(65) Prior Publication Data

US 2024/0088740 A1   Mar. 14, 2024

(30) Foreign Application Priority Data

Sep. 9, 2022   (JP) .................................. 2022-143937

(51) Int. Cl.
*H02K 5/173* (2006.01)
*F16C 19/08* (2006.01)
*H02K 7/08* (2006.01)

(52) U.S. Cl.
CPC ........... *H02K 5/1732* (2013.01); *F16C 19/08* (2013.01); *H02K 7/083* (2013.01); *F16C 2380/26* (2013.01)

(58) Field of Classification Search
CPC ...... H02K 5/1732; H02K 7/083; F16C 19/08; F16C 2380/26
See application file for complete search history.

(56) References Cited

U.S. PATENT DOCUMENTS

| 2015/0364966 A1 | 12/2015 | Maihara et al. |
| 2019/0229576 A1 | 7/2019 | Miura et al. |

FOREIGN PATENT DOCUMENTS

| JP | 3448416 B | 9/2003 |
| JP | 6670863 B | 3/2020 |
| JP | 2021-90311 A | 6/2021 |
| WO | WO 2014/136504 A1 | 9/2014 |

*Primary Examiner* — Terrance L Kenerly
(74) *Attorney, Agent, or Firm* — McGinn IP Law Group, PLLC

(57) ABSTRACT

A rotary electric machine includes a rotor including a shaft, a stator disposed around the rotor, a housing configured to house the stator, a first annular member disposed on the stator and having first recesses disposed in a circumferential direction, a second annular member disposed on the housing and having second recesses disposed in the circumferential direction, and balls interposed between the first annular member and the second annular member. Each ball is disposed in both of each of the first recesses and each of the second recesses. The first annular member, the second annular member, and the balls constitute a coupling mechanism configured to couple the housing and the stator to each other. A backlash in a radial direction in the coupling mechanism is narrower than a backlash in the circumferential direction in the coupling mechanism and narrower than a backlash in an axial direction in the coupling mechanism.

8 Claims, 8 Drawing Sheets

ROTARY ELECTRIC MACHINE

CROSS-REFERENCE TO RELATED APPLICATIONS

The present application claims priority from Japanese Patent Application No. 2022-143937 filed on Sep. 9, 2022, the entire contents of which are hereby incorporated by reference.

BACKGROUND

The disclosure relates to a rotary electric machine.

A motor-generator, which is a rotary electric machine, is mounted in a vehicle, such as a hybrid vehicle and an electric vehicle. The motor-generator includes a stator attached to a housing, and a rotor held inside the stator (see Japanese Unexamined Patent Application Publication (JP-A) No. 2021-90311, International Patent Application Publication WO 2014/136504A1, Japanese Patent (JP) No. 6670863, and JP No. 3448416).

SUMMARY

An aspect of the disclosure provides a rotary electric machine including a rotor, a stator, a housing, a first annular member, a second annular member, and balls. The rotor includes a shaft. The stator is disposed around the rotor. The housing is configured to house the stator. The first annular member is disposed on the stator and has first recesses disposed in a circumferential direction. The second annular member is disposed on the housing and has second recesses disposed in the circumferential direction. The balls are interposed between the first annular member and the second annular member. Each of the balls is disposed in both of each of the first recesses and each of the second recesses. The first annular member, the second annular member, and the balls constitute a coupling mechanism configured to couple the housing and the stator to each other. A backlash in a radial direction in the coupling mechanism is narrower than a backlash in the circumferential direction in the coupling mechanism and narrower than a backlash in an axial direction in the coupling mechanism.

BRIEF DESCRIPTION OF THE DRAWINGS

The accompanying drawings are included to provide a further understanding of the disclosure and are incorporated in and constitute a part of this specification. The drawings illustrate an embodiment and, together with the specification, serve to describe the principles of the disclosure.

DETAILED DESCRIPTION

When power is supplied to stator coils, a stator of a motor-generator starts vibration due to magnetostriction, and the vibration is transmitted from the stator to a housing where the stator is held. In this manner, the vibration transmission from the stator to the housing is a cause of increasing vibration and noise of the motor-generator. Therefore, there has been a demand for reducing the vibration transmission from the stator to the housing.

It is desirable to reduce vibration transmission from a stator to its housing.

In the following, an embodiment of the disclosure is described in detail with reference to the accompanying drawings. Note that the following description is directed to an illustrative example of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiment which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same numerals to avoid any redundant description.

Power Unit

Figure 1:
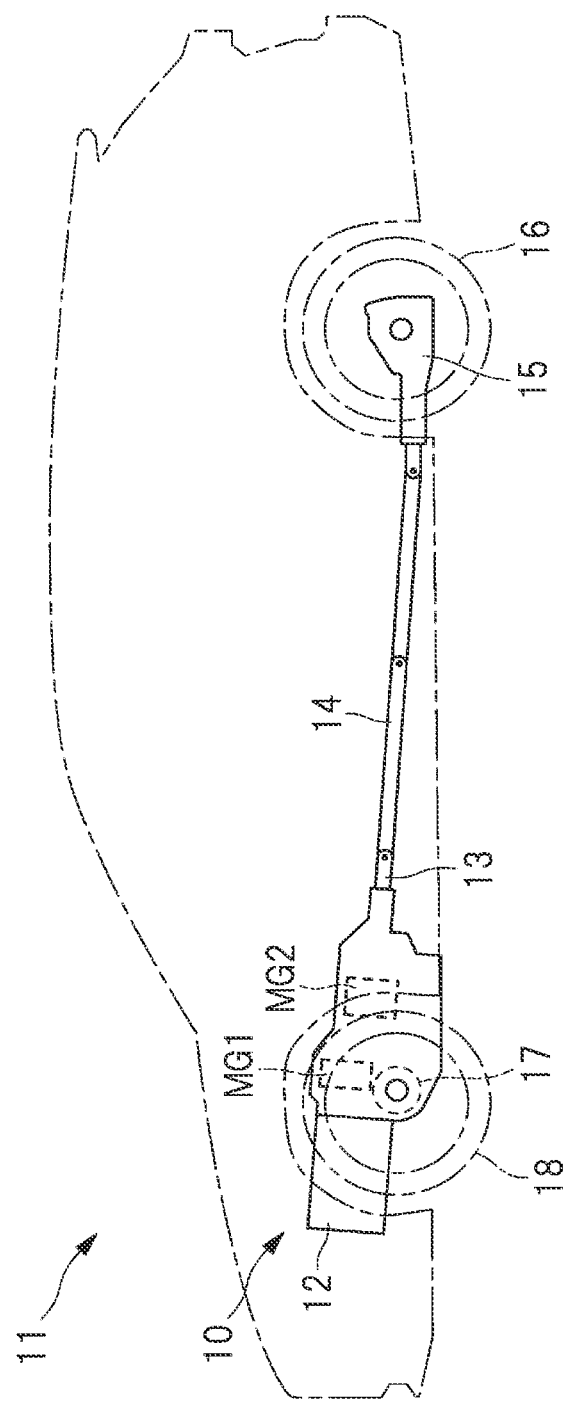
FIG. 1 is a diagram illustrating a vehicle on which a power unit is mounted.

FIG. 1 is a diagram illustrating a vehicle 11 on which a power unit 10 is mounted. As illustrated in FIG. 1, the power unit 10 including an engine 12 and motor-generators MG1 and MG2 is mounted on the vehicle 11. Rear wheels 16 are coupled to a rear-wheel output shaft 13 of the power unit 10 via a propeller shaft 14 and a rear differential mechanism 15. A front differential mechanism 17 is incorporated in the power unit 10, and front wheels 18 are coupled to the front differential mechanism 17. The power unit 10 illustrated in the drawing is a power unit for all-wheel drive. However, this is not to be construed in a limiting sense. The power unit 10 may be a power unit for front-wheel drive or for rear-wheel drive.

Figure 2:
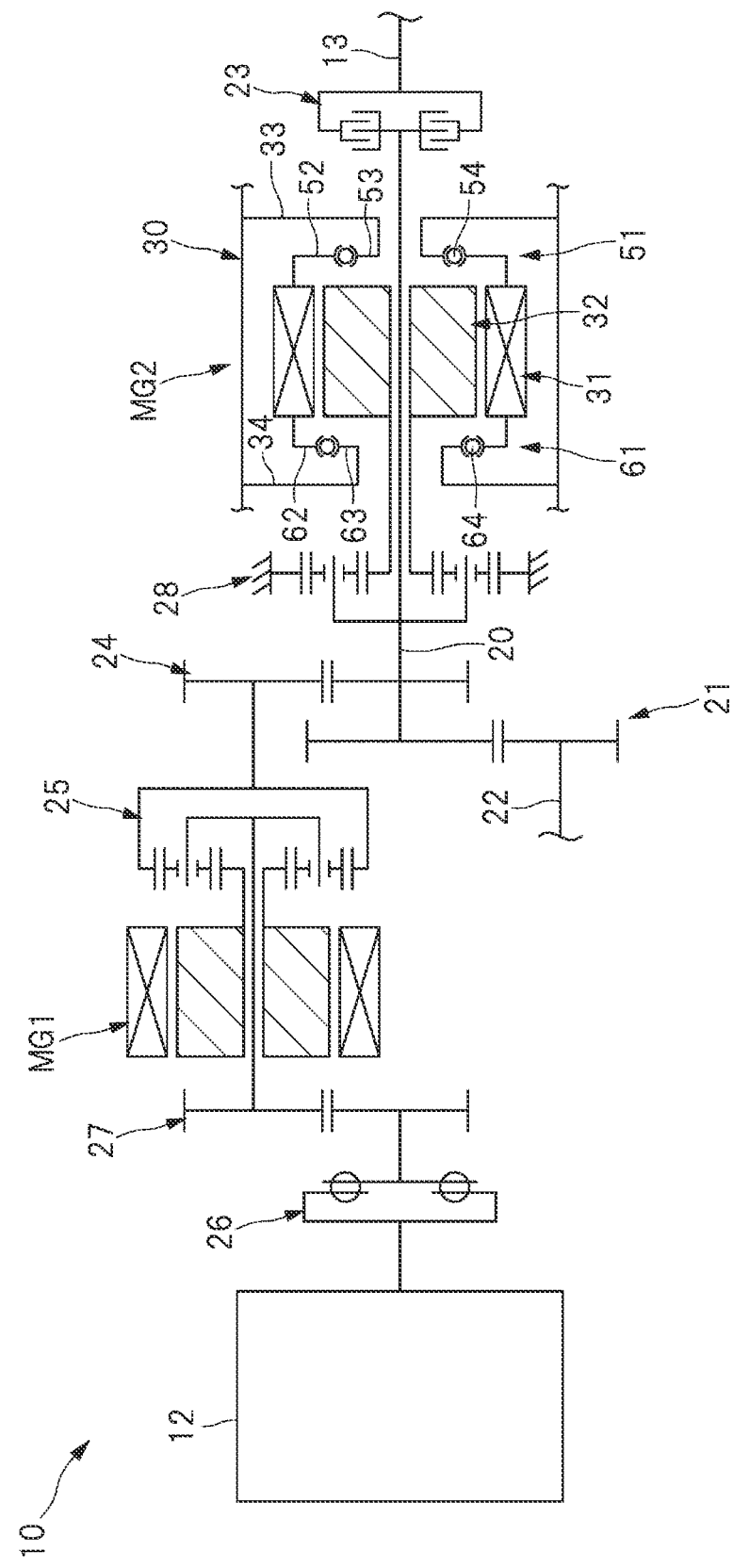
FIG. 2 is a diagram illustrating an example of an internal configuration of the power unit.

FIG. 2 is a diagram illustrating an example of an internal configuration of the power unit 10. As illustrated in FIG. 2, to output engine torque and motor torque to the front and rear wheels, the power unit 10 includes a main output shaft 20 extending through the center of the motor-generator MG2. A front-wheel output shaft 22 is coupled to the main output shaft 20 via a gear train 21, and the rear-wheel output shaft 13 is coupled to the main output shaft 20 via a transfer clutch 23. A power splitting mechanism 25 including a planetary gear train is also coupled to the main output shaft 20 via a gear train 24. The motor-generator MG1 is coupled to the power splitting mechanism 25, and the engine 12 is coupled to the power splitting mechanism 25 via a damper mechanism 26 and a gear train 27. The motor-generator MG2 is coupled to the main output shaft 20 via a planetary gear train 28. It is noted that the front differential mechanism 17 is coupled to the front-wheel output shaft 22.

Motor-Generator (Rotary Electric Machine)

Figure 3:
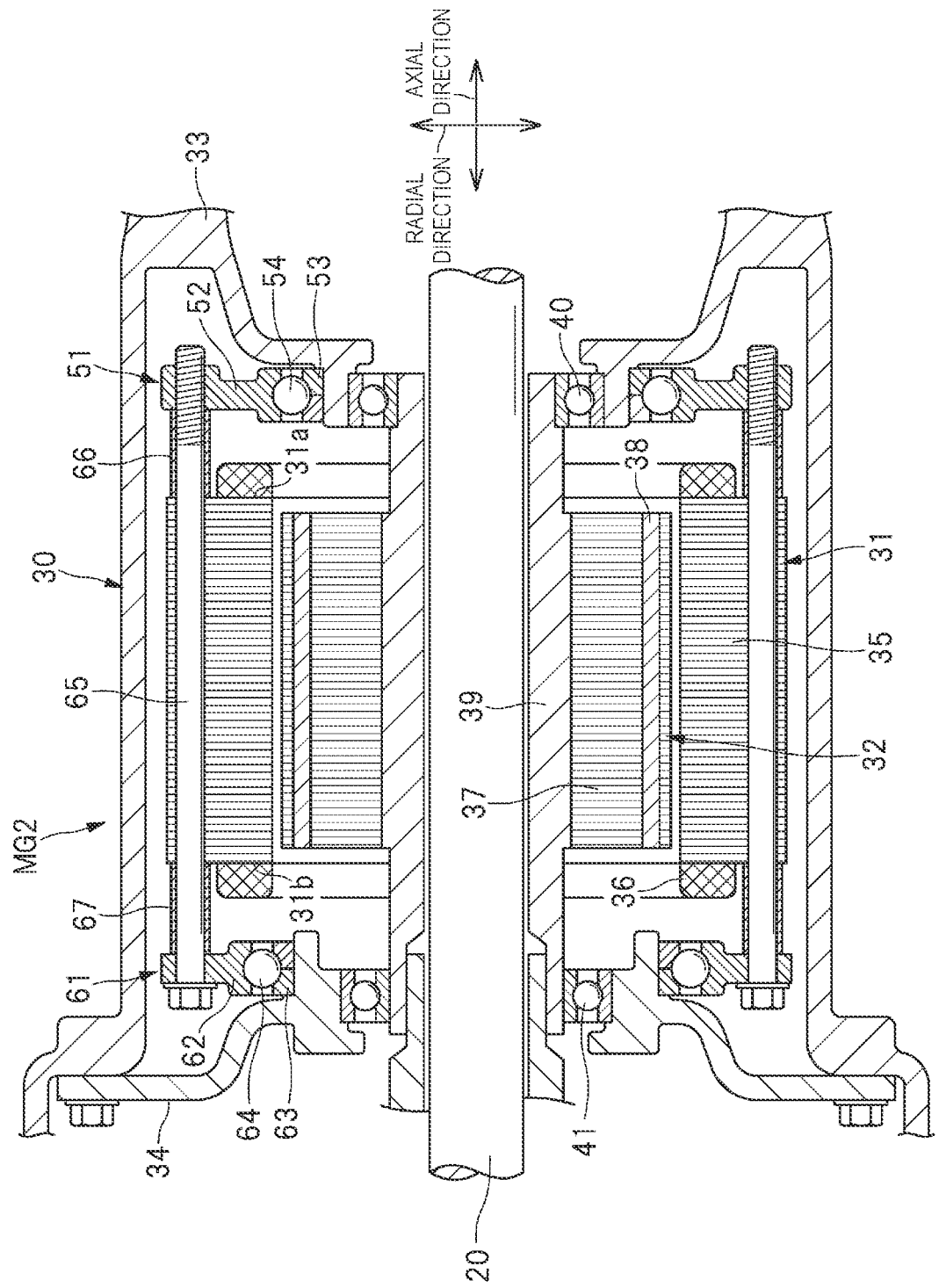
FIG. 3 is a cross-sectional view of a motor-generator as a rotary electric machine according to one embodiment of the disclosure.

FIG. 3 is a cross-sectional view of the motor-generator MG2 as a rotary electric machine according to one embodiment of the disclosure. As illustrated in FIG. 3, the motor-generator MG2 includes a stator 31 of a hollow cylindrical shape held in a housing 30, and a rotor 32 held radially inside the stator 31. That is, the stator 31 surrounding the rotor 32 is disposed in the housing 30 of the motor-generator MG2. The housing 30 includes a housing body 33 of a hollow cylindrical shape surrounding the stator 31, and a housing cover 34 attached to an open end of the housing body 33.

The stator 31 includes a stator core 35 of a hollow cylindrical shape including electromagnetic steel plates, and stator coils 36 of three phases wound on the stator core 35. The rotor 32 includes a rotor core 37 of a hollow cylindrical shape including electromagnetic steel plates, permanent magnets 38 buried in the rotor core 37, and a hollow rotor shaft 39 secured in the center of the rotor core 37. In one embodiment, the rotor shaft 39 may serve as a "shaft". One end of the rotor shaft 39 is supported by the housing body 33 via bearings 40 whereas the other end of the rotor shaft 39 is supported by the housing cover 34 via bearings 41.

A first end 31a of the stator 31 and the housing body 33 are coupled to each other via a first coupling mechanism 51. In one embodiment, the first end 31a may serve as a "first end", and the first coupling mechanism 51 may serve as a "coupling mechanism". The first coupling mechanism 51 includes a first outer-ring member 52 attached to the stator 31, and a first inner-ring member 53 attached to the housing body 33. In one embodiment, the first outer-ring member 52 may serve as a "first annular member", an "outer-ring member", and a "first stator-side annular member", and the first inner-ring member 53 may serve as a "second annular member", an "inner-ring member", and a "first housing-side annular member". The first outer-ring member 52 and the first inner-ring member 53 are disposed in a radial direction from each other, and first balls 54 are interposed between the first outer-ring member 52 and the first inner-ring member 53. In one embodiment, the first balls 54 may serve as "balls".

Similarly, a second end 31b of the stator 31 and the housing cover 34 are coupled to each other via a second coupling mechanism 61. In one embodiment, the second end 31b may serve as a "second end", and the second coupling mechanism 61 may serve as the "coupling mechanism". The second coupling mechanism 61 includes a second outer-ring member 62 attached to the stator 31, and a second inner-ring member 63 attached to the housing cover 34. In one embodiment, the second outer-ring member 62 may serve as the "first annular member", the "outer-ring member", and the "second stator-side annular member", and the second inner-ring member 63 may serve as the "second annular member", the "inner-ring member", and the "second housing-side annular member". The second outer-ring member 62 and the second inner-ring member 63 are disposed in the radial direction from each other, and second balls 64 are interposed between the second outer-ring member 62 and the second inner-ring member 63. In one embodiment, the second balls 64 may serve as the "balls".

The first outer-ring member 52 and the second outer-ring member 62 are secured to the stator 31 using fastening bolts 65 whereas the first inner-ring member 53 and the second inner-ring member 63 are secured to the housing 30 by spline-fitting. It is noted that to position the stator 31 in an axial direction, a spacer 66 configured to restrict an interval is interposed between the stator 31 and the first outer-ring member 52, and that a spacer 67 configured to restrict an interval is interposed between the stator 31 and the second outer-ring member 62.

Coupling Mechanisms

Figure 4:
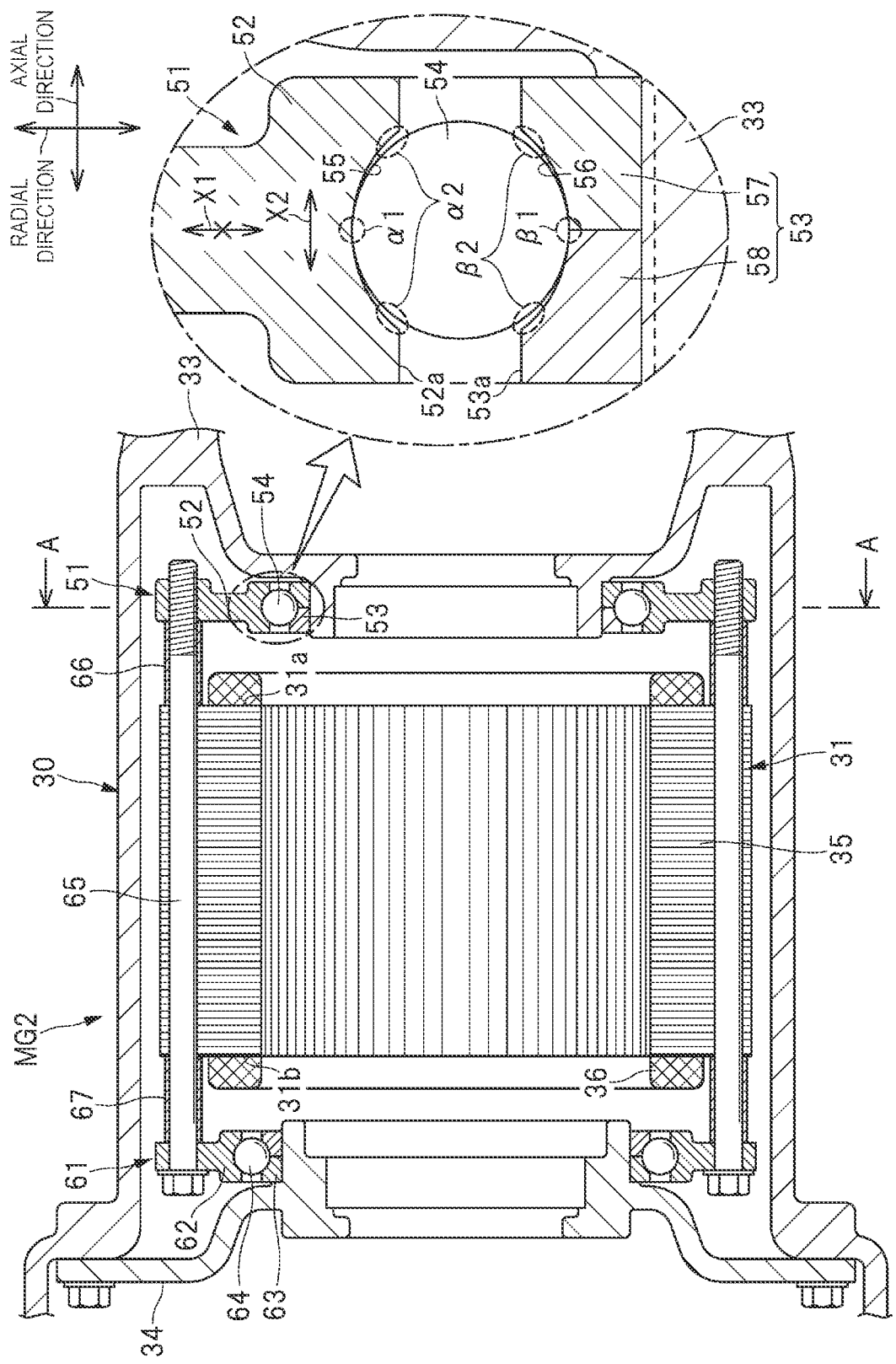
FIG. 4 is a cross-sectional view of the motor-generator from which a rotor is detached.
Figure 5:
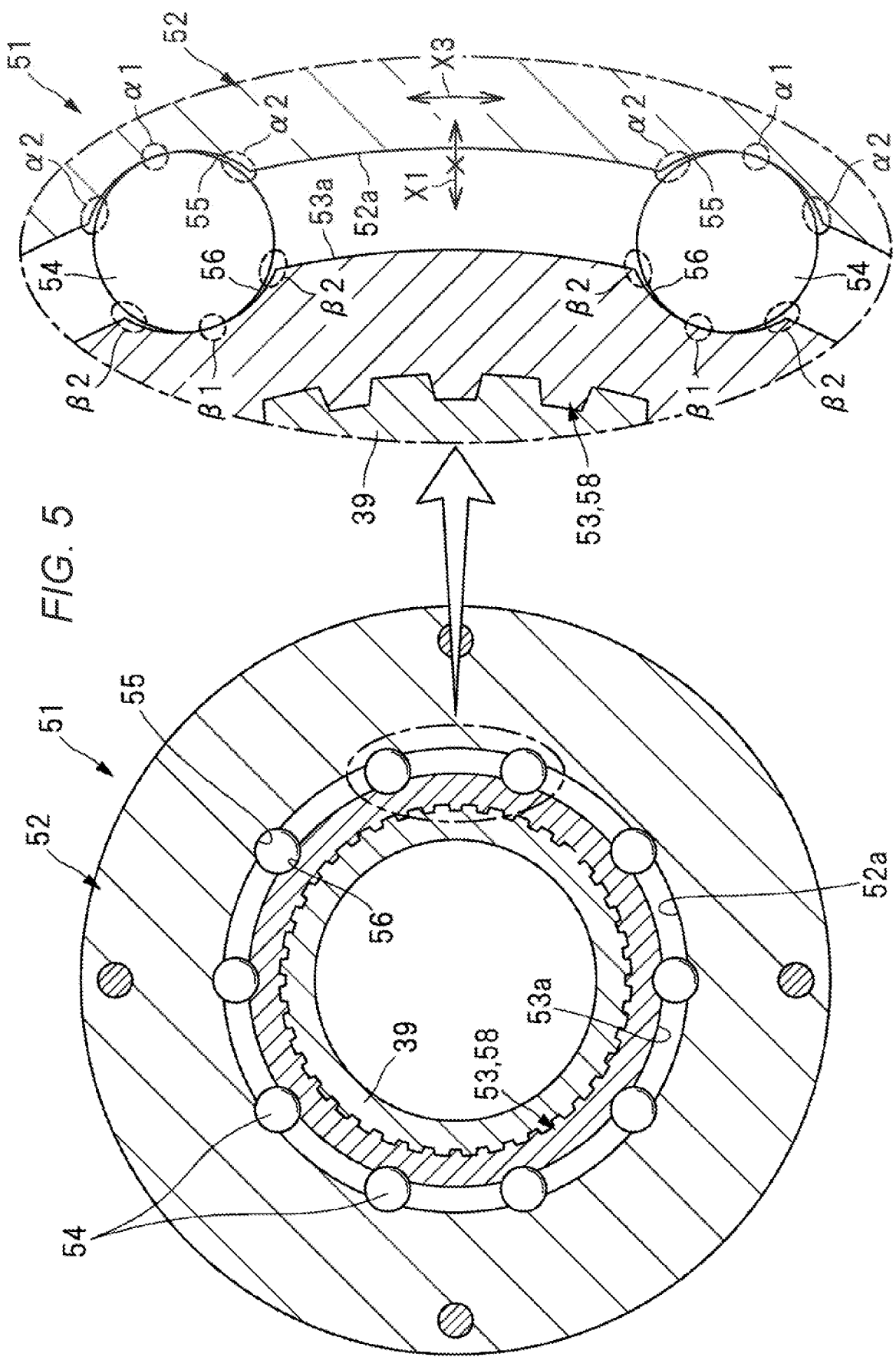
FIG. 5 is a cross-sectional view of a first coupling mechanism, taken along line A-A in FIG. 4.
Figure 6:
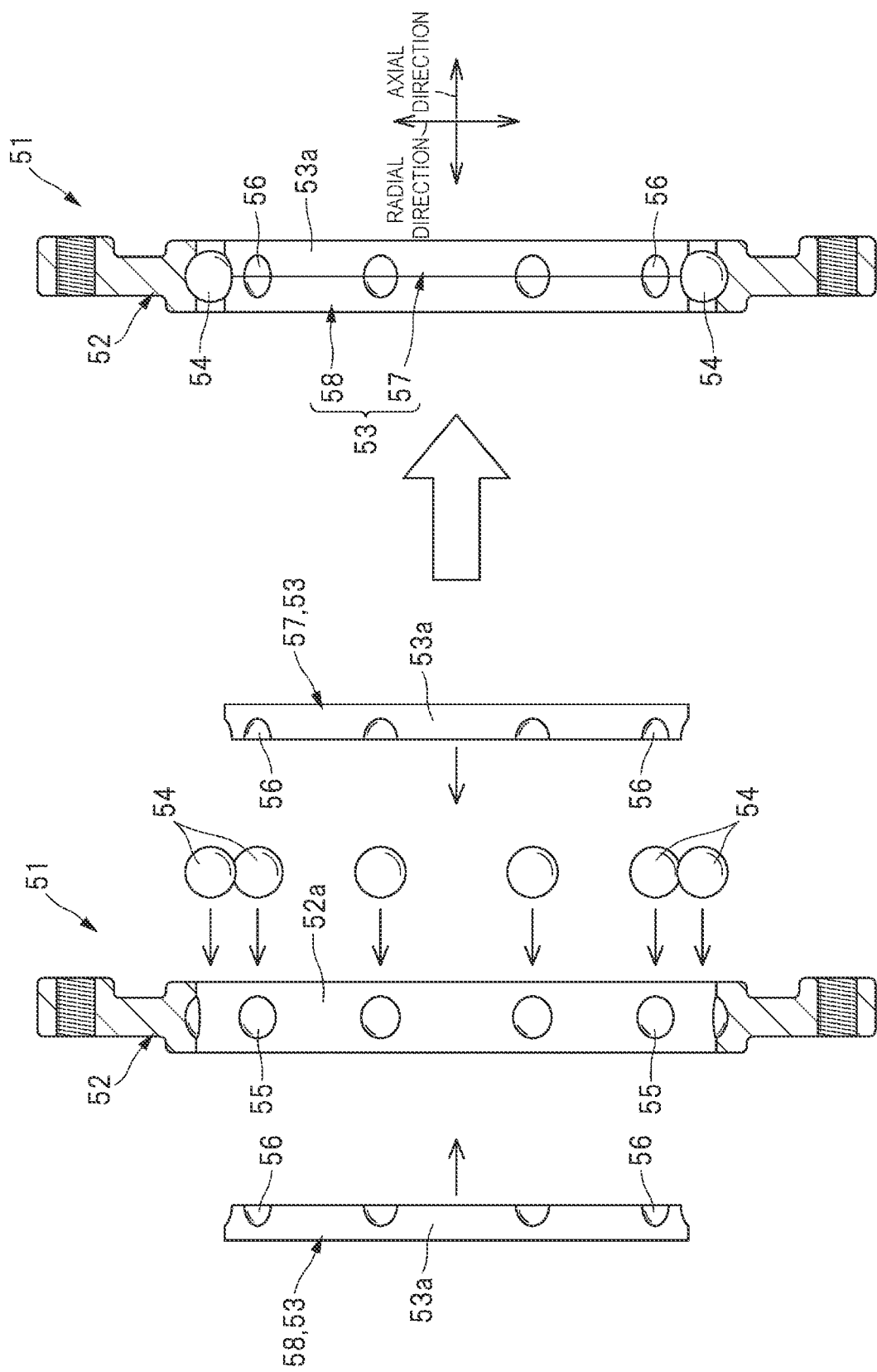
FIG. 6 is a diagram illustrating a disassembled state and an assembled state of the first coupling mechanism.

Next, configurations of the coupling mechanisms 51 and 61 configured to couple the housing 30 and the stator 31 to each other will be described. The following description concerns the configuration of the first coupling mechanism 51. Because the first coupling mechanism 51 and the second coupling mechanism 61 have similar configurations, a description on the configuration of the second coupling mechanism 61 will be omitted. FIG. 4 is a cross-sectional view of the motor-generator MG2 from which the rotor 32 is detached. FIG. 5 is a cross-sectional view of the first coupling mechanism 51, taken along line A-A in FIG. 4. FIG. 6 is a diagram illustrating a disassembled state and an assembled state of the first coupling mechanism 51. FIG. 6 illustrates a cross section of the first outer-ring member 52 and a side surface of the first inner-ring member 53.

As illustrated in FIG. 4 and FIG. 5, the first coupling mechanism 51 includes the first outer-ring member 52 of an annular shape disposed on the stator 31. First recesses 55 are disposed in an inner peripheral surface 52a of the first outer-ring member 52 at regular intervals in a circumferential direction. The first coupling mechanism 51 includes the first inner-ring member 53 of an annular shape disposed on the housing 30. Second recesses 56 are disposed in an outer peripheral surface 53a of the first inner-ring member 53 at regular intervals in the circumferential direction. The first balls 54 are interposed between the first outer-ring member 52 and the first inner-ring member 53 in such a manner that each of the first balls 54 is disposed in both of each of the first recesses 55 and each of the second recesses 56, which are spherical recesses.

As illustrated in FIG. 6, because the first balls 54 are interposed between the first outer-ring member 52 and the first inner-ring member 53, the first inner-ring member 53 is dividable in the center into two annular members 57 and 58. In one embodiment, the annular members 57 and 58 may serve as "members". That is, after the first balls 54 are disposed in the first recesses 55 of the first outer-ring member 52, the pair of annular members 57 and 58 are assembled with each other to sandwich the first balls 54. It is noted that the pair of annular members 57 and 58 that constitute the first inner-ring member 53 are secured using, for example, screw members, not illustrated. In the illustrated example, the first inner-ring member 53 is divided into the two annular members 57 and 58. However, this is not to be construed in a limiting sense. The first inner-ring member 53 may be divided into three or more members. Moreover, in the illustrated example, the first inner-ring member 53 is divided into the two annular members 57 and 58. However, this is not to be construed in a limiting sense. The first outer-ring member 52 may be divided into two or more members. Both of the first outer-ring member 52 and the first inner-ring member 53 may be divided into two or more members.

As illustrated in enlarged portions in FIG. 4 and FIG. 5, curvatures of the first recesses 55 and the second recesses 56 are set at smaller values than a curvature of the first balls 54. That is, curvature radii of the first recesses 55 and the second recesses 56 are larger than a curvature radius of the first balls 54. With the first recesses 55 and the second recesses 56 being thus set, the center of each of the first recesses 55 is in close contact with each of the first balls 54 as indicated by symbols $\alpha 1$ whereas a gap is provided between a peripheral portion of the first recess 55 and the first ball 54 as indicated by symbols $\alpha 2$. Similarly, the center of each of the second recesses 56 is in close contact with each of the first balls 54 as indicated by symbols $\beta 1$ whereas a gap is provided between a peripheral portion of the second recess 56 and the first ball 54 as indicated by symbols β2.

In this manner, the first balls 54 are in close contact with the first recesses 55 at the center, and the first balls 54 are in close contact with the second recesses 56 at the center, so that movement of the first outer-ring member 52 in the radial direction is restricted as indicated by arrow X1 in FIG. 4 and FIG. 5. Moreover, the gaps are provided between the peripheral portions of the first recesses 55 and the first balls 54, and the gaps are provided between the peripheral portions of the second recesses 56 and the first balls 54, so that movement of the first outer-ring member 52 in the axial direction is allowed as indicated by arrow X2 in FIG. 4. Furthermore, the gaps are provided between the peripheral portions of the first recesses 55 and the first balls 54, and the gaps are provided between the peripheral portions of the second recesses 56 and the first balls 54, so that movement of the first outer-ring member 52 in the circumferential direction is allowed as indicated by arrow X3 in FIG. 5.

That is, a backlash, which is play, in the radial direction in the first coupling mechanism 51 is narrower than a backlash in the circumferential direction in the first coupling mechanism 51 and narrower than a backlash in the axial direction in the first coupling mechanism 51. In other words, when a load of the same magnitude is input to the first outer-ring member 52 of the first coupling mechanism 51, a movement amount of the first outer-ring member 52 in the radial direction is less than a movement amount of the first outer-ring member 52 in the circumferential direction and less than a movement amount of the first outer-ring member 52 in the axial direction. To put it differently, a rigidity of the first coupling mechanism 51 in the radial direction is higher than a rigidity of the first coupling mechanism 51 in the circumferential direction and higher than a rigidity of the first coupling mechanism 51 in the axial direction.

Thus, even when magnetostriction at the time of power supply to the coils causes vibration of the stator 31, transmission of the vibration to the housing 30 via the coupling mechanisms 51 and 61 can be prevented or reduced to prevent vibration and noise of the motor-generator MG2. Besides, because the movement of the outer-ring members 52 and 62 in the coupling mechanisms 51 and 61 in the radial direction is restricted, the stator 31 can be prevented from moving in the radial direction so as to appropriately maintain an air gap, which is an interval between the stator 31 and the rotor 32 in the radial direction.

First Modified Embodiment

Figure 7:
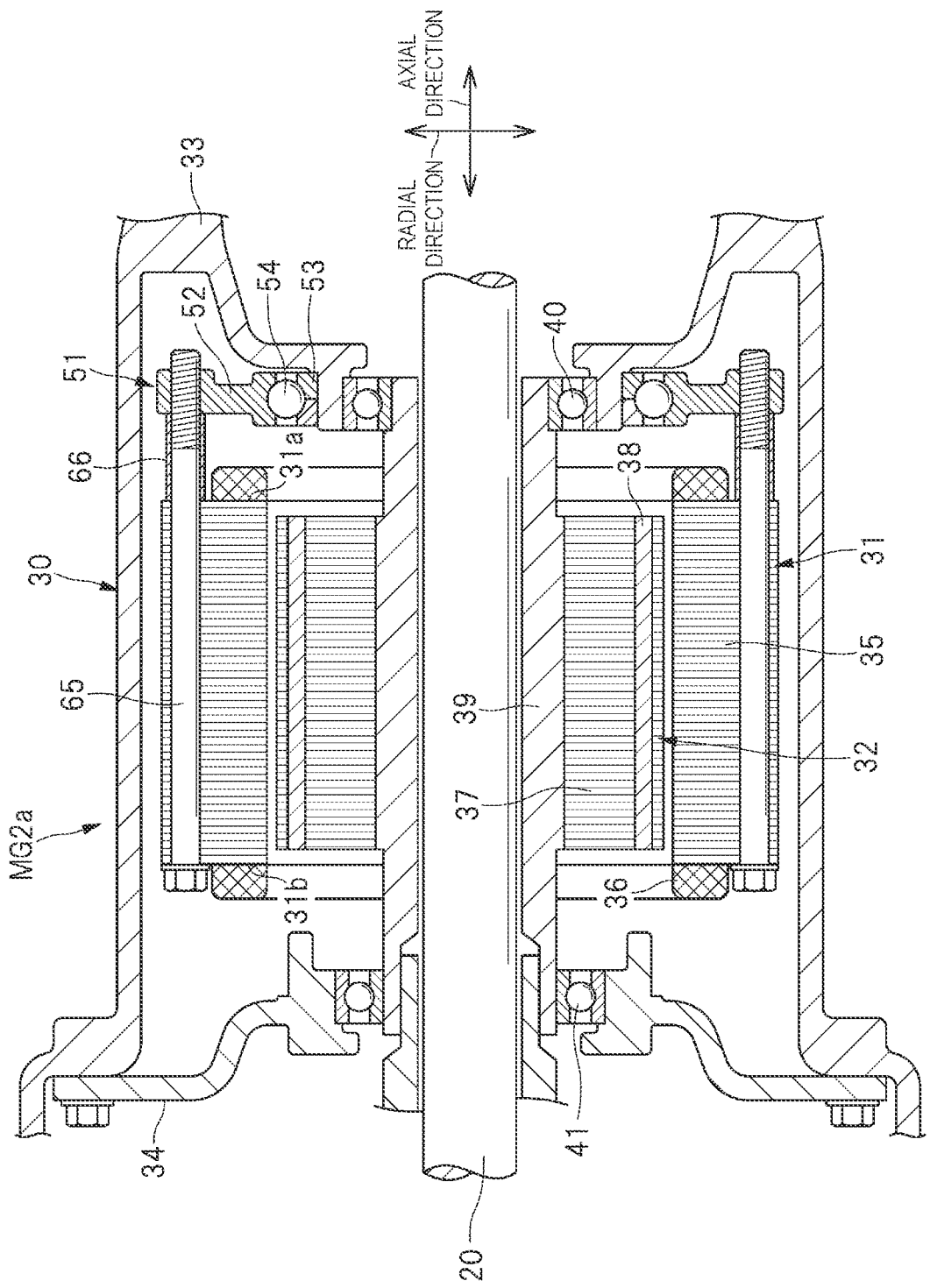
FIG. 7 is a cross-sectional view of a motor-generator according to a first modified embodiment of the disclosure.

In the example illustrated in FIG. 3, the housing 30 and the stator 31 are coupled to each other by the two coupling mechanisms 51 and 61. However, this is not to be construed in a limiting sense. The housing 30 and the stator 31 may be coupled to each other by the single coupling mechanism 51, for example. FIG. 7 is a cross-sectional view of a motor-generator MG2a according to a first modified embodiment of the disclosure. It is noted that in FIG. 7, substantially the same components as those illustrated in FIG. 3 are denoted with identical reference symbols and will not be repeatedly elaborated.

As illustrated in FIG. 7, the first end 31a of the stator 31 and the housing body 33 are coupled to each other via the first coupling mechanism 51. The first coupling mechanism 51 includes the first outer-ring member 52 attached to the stator 31, and the first inner-ring member 53 attached to the housing body 33. The first coupling mechanism 51 also includes the first balls 54 interposed between the first outer-ring member 52 and the first inner-ring member 53. The first outer-ring member 52 is secured to the stator 31 using the fastening bolts 65 whereas the first inner-ring member 53 is secured to the housing 30 by spline-fitting. It is noted that to position the stator 31 in the axial direction, the spacer 66 configured to restrict an interval is interposed between the stator 31 and the first outer-ring member 52. Even when the housing 30 and the stator 31 are coupled to each other by the single coupling mechanism 51 in this manner, vibration and noise of the motor-generator MG2a can be prevented while an air gap in the motor-generator MG2a is appropriately maintained in a manner similar to the motor-generator MG2 illustrated in FIG. 3.

Second Modified Embodiment

Figure 8:
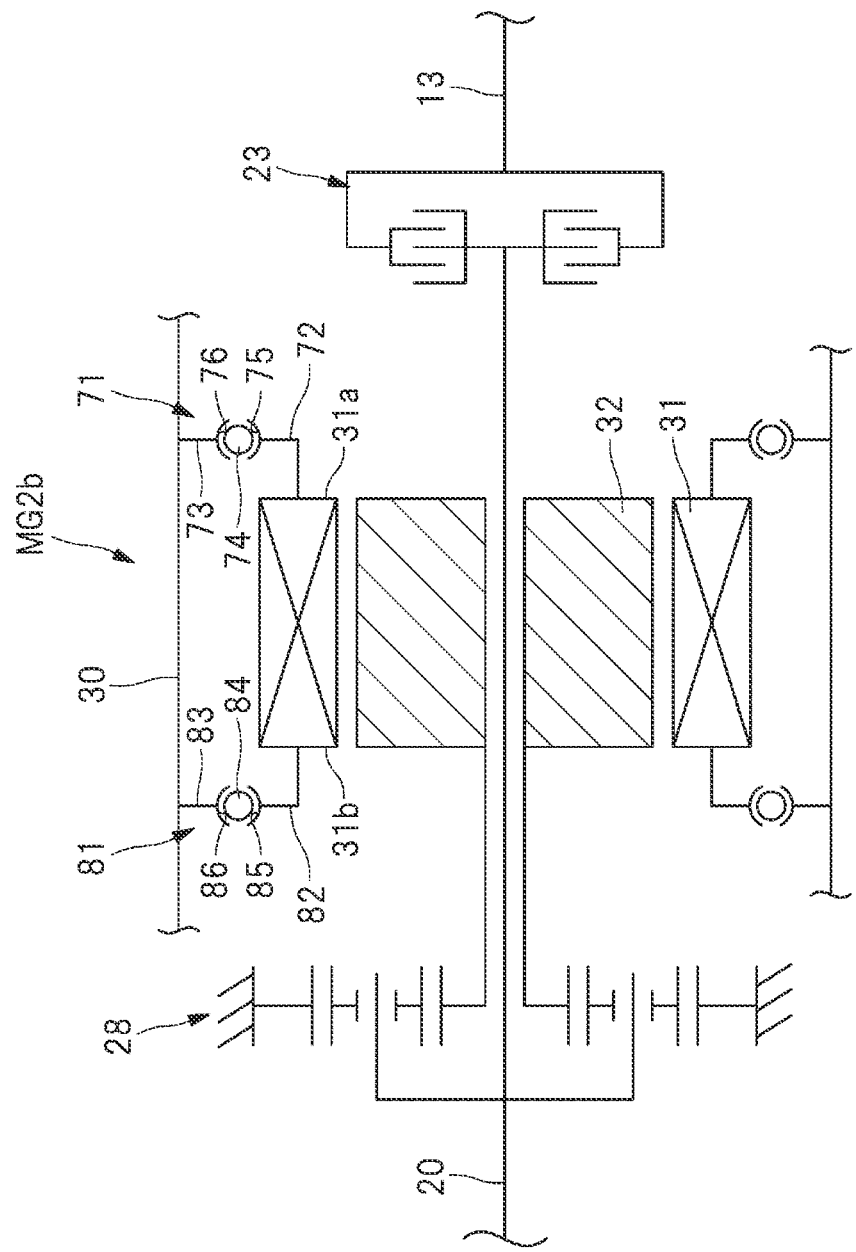
FIG. 8 is a diagram illustrating a motor-generator according to a second modified embodiment of the disclosure.

In the example illustrated in FIG. 2 and FIG. 3, the first and second outer-ring members 52 and 62 are attached to the stator 31, and the first and second inner-ring members 53 and 63 are attached to the housing 30. However, this is not to be construed in a limiting sense. The first and second inner-ring members 53 and 63 may be attached to the stator 31, and the first and second outer-ring members 52 and 62 may be attached to the housing 30. FIG. 8 is a diagram illustrating a motor-generator MG2b according to a second modified embodiment of the disclosure. It is noted that in FIG. 8, substantially the same components as those illustrated in FIG. 2 are denoted with identical reference symbols and will not be repeatedly elaborated.

As illustrated in FIG. 8, the first end 31a of the stator 31 and the housing 30 are coupled to each other via a first coupling mechanism 71. In one embodiment, the first coupling mechanism 71 may serve as the "coupling mechanism". The first coupling mechanism 71 includes a first inner-ring member 72 attached to the stator 31, and a first outer-ring member 73 attached to the housing 30. In one embodiment, the first inner-ring member 72 may serve as the "first annular member", the "inner-ring member", and the "first stator-side annular member", and the first outer-ring member 73 may serve as the "second annular member", the "outer-ring member", and the "first housing-side annular member". The first inner-ring member 72 and the first outer-ring member 73 are disposed in the radial direction from each other, and first balls 74 are disposed in first recesses 75 of the first inner-ring member 72 and second recesses 76 of the first outer-ring member 73. In one embodiment, the first balls 74 may serve as the "balls". It is noted that curvatures of the first recesses 75 and the second recesses 76 are set at smaller values than a curvature of the first balls 74.

Similarly, the second end 31b of the stator 31 and the housing 30 are coupled to each other via a second coupling mechanism 81. In one embodiment, the second coupling mechanism 81 may serve as the "coupling mechanism". The second coupling mechanism 81 includes a second inner-ring member 82 attached to the stator 31, and a second outer-ring member 83 attached to the housing 30. In one embodiment, the second inner-ring member 82 may serve as the "first annular member", the "inner-ring member", and the "second stator-side annular member", and the second outer-ring member 83 may serve as the "second annular member", the "outer-ring member", and the "second housing-side annular member". The second inner-ring member 82 and the second outer-ring member 83 are disposed in the radial direction from each other, and second balls 84 are interposed between first recesses 85 of the second inner-ring member 82 and second recesses 86 of the second outer-ring member 83. In one embodiment, the second balls 84 may serve as the "balls". It is noted that curvatures of the first recesses 85 and the second recesses 86 are set at smaller values than a curvature of the second balls 84.

Even when the housing 30 and the stator 31 are coupled to each other by the first coupling mechanism 71 and the second coupling mechanism 81 in this manner, vibration and noise of the motor-generator MG2b can be prevented while an air gap in the motor-generator MG2b is appropriately maintained in a manner similar to the motor-generator MG2 illustrated in FIG. 2. That is, a backlash in the radial direction in the first coupling mechanism 71 is narrower than a backlash in the circumferential direction in the first coupling mechanism 71 and narrower than a backlash in the axial direction in the first coupling mechanism 71. A backlash in the radial direction in the second coupling mechanism 81 is narrower than a backlash in the circumferential direction in the second coupling mechanism 81 and narrower than a backlash in the axial direction in the second coupling mechanism 81. Thus, even when magnetostriction at the time of power supply to the coils causes vibration of the stator 31, transmission of the vibration to the housing 30 via the coupling mechanisms 71 and 81 can be reduced to prevent vibration and noise of the motor-generator MG2b. Besides, because the movement of the outer-ring members 73 and 83 in the coupling mechanisms 71 and 81 in the radial direction is restricted, the stator 31 can be prevented from moving in the radial direction so as to appropriately maintain an air gap between the stator 31 and the rotor 32.

The disclosure is not limited to the foregoing embodiments, and various modifications can be made thereto within the scope that does not depart from the gist thereof. In the illustrated example, the disclosure is applied to the motor-generator MG2. However, this is not to be construed in a limiting sense. The disclosure may be applied to the motor-generator MG1. In the illustrated example, the disclosure is applied to the motor-generator MG2 incorporated in the power unit 10 of the hybrid vehicle. However, this is not to be construed in a limiting sense. The disclosure may be applied to, for example, an electric axle including a differential mechanism and a rotary electric machine that are housed within a housing. It is noted that a rotary electric machine to which the disclosure is applicable is not limited to a rotary electric machine for use in a hybrid vehicle and an electric vehicle, for example, and that the disclosure may be applied to a rotary electric machine provided for other apparatus.

In the above description, the fastening bolts 65 are used to attach the outer-ring members 52 and 62 to the stator 31. However, this is not to be construed in a limiting sense. The outer-ring members 52 and 62 may be attached to the stator 31 by other methods. In the above description, spline-fitting is adopted to attach the inner-ring members 53 and 63 to the housing 30. However, this is not to be construed in a limiting sense. The inner-ring members 53 and 63 may be attached to the housing 30 by other methods.

The invention claimed is:

1. A rotary electric machine comprising:
a rotor comprising a shaft;
a stator disposed around the rotor;
a housing configured to house the stator;
a first annular member disposed on the stator and having first recesses disposed in a circumferential direction;
a second annular member disposed on the housing and having second recesses disposed in the circumferential direction; and
balls interposed between the first annular member and the second annular member, each of the balls being disposed in both of each of the first recesses and each of the second recesses,
wherein the first annular member, the second annular member, and the balls constitute a coupling mechanism configured to couple the housing and the stator to each other, and
wherein a backlash in a radial direction in the coupling mechanism is narrower than a backlash in the circumferential direction in the coupling mechanism and narrower than a backlash in an axial direction in the coupling mechanism.

2. The rotary electric machine according to claim 1,
wherein the first annular member is an outer-ring member having an inner peripheral surface where the first recesses are disposed, and
wherein the second annular member is an inner-ring member having an outer peripheral surface where the second recesses are disposed.

3. The rotary electric machine according to claim 1,
wherein the first annular member is an inner-ring member having an outer peripheral surface where the first recesses are disposed, and
wherein the second annular member is an outer-ring member having an inner peripheral surface where the second recesses are disposed.

4. The rotary electric machine according to claim 1,
wherein one or both of the first annular member and the second annular member are dividable into two or more members.

5. The rotary electric machine according to claim 1,
wherein the first annular member disposed on the stator comprises
a first stator-side annular member disposed on a first end of the stator, and
a second stator-side annular member disposed on a second end of the stator,
wherein the second annular member disposed on the housing comprises
a first housing-side annular member disposed in the radial direction of the first stator-side annular member, and
a second housing-side annular member disposed in the radial direction of the second stator-side annular member,
wherein the balls comprise
first balls interposed between the first stator-side annular member and the first housing-side annular member, and
second balls interposed between the second stator-side annular member and the second housing-side annular member, and
wherein the coupling mechanism comprises
a first coupling mechanism comprising:
the first stator-side annular member;
the first housing-side annular member; and
the first balls, and
a second coupling mechanism comprising:
the second stator-side annular member;
the second housing-side annular member; and
the second balls.

6. The rotary electric machine according to claim 2,
wherein the first annular member disposed on the stator comprises
a first stator-side annular member disposed on a first end of the stator, and
a second stator-side annular member disposed on a second end of the stator, wherein the second annular member disposed on the housing comprises
a first housing-side annular member disposed in the radial direction of the first stator-side annular member, and
a second housing-side annular member disposed in the radial direction of the second stator-side annular member,
wherein the balls comprise
first balls interposed between the first stator-side annular member and the first housing-side annular member, and
second balls interposed between the second stator-side annular member and the second housing-side annular member, and
wherein the coupling mechanism comprises
a first coupling mechanism comprising:
the first stator-side annular member;
the first housing-side annular member; and
the first balls, and
a second coupling mechanism comprising:
the second stator-side annular member;
the second housing-side annular member; and
the second balls.

7. The rotary electric machine according to claim 3,
wherein the first annular member disposed on the stator comprises
a first stator-side annular member disposed on a first end of the stator, and
a second stator-side annular member disposed on a second end of the stator,
wherein the second annular member disposed on the housing comprises
a first housing-side annular member disposed in the radial direction of the first stator-side annular member, and
a second housing-side annular member disposed in the radial direction of the second stator-side annular member,
wherein the balls comprise
first balls interposed between the first stator-side annular member and the first housing-side annular member, and
second balls interposed between the second stator-side annular member and the second housing-side annular member, and
wherein the coupling mechanism comprises
a first coupling mechanism comprising:
the first stator-side annular member;
the first housing-side annular member; and
the first balls, and
a second coupling mechanism comprising:
the second stator-side annular member;
the second housing-side annular member; and
the second balls.

8. The rotary electric machine according to claim 4,
wherein the first annular member disposed on the stator comprises
a first stator-side annular member disposed on a first end of the stator, and
a second stator-side annular member disposed on a second end of the stator,
wherein the second annular member disposed on the housing comprises
a first housing-side annular member disposed in the radial direction of the first stator-side annular member, and
a second housing-side annular member disposed in the radial direction of the second stator-side annular member,
wherein the balls comprise
first balls interposed between the first stator-side annular member and the first housing-side annular member, and
second balls interposed between the second stator-side annular member and the second housing-side annular member, and
wherein the coupling mechanism comprises
a first coupling mechanism comprising:
the first stator-side annular member;
the first housing-side annular member; and
the first balls, and
a second coupling mechanism comprising:
the second stator-side annular member;
the second housing-side annular member; and
the second balls.

* * * * *